Feb. 21, 1950 S. NIELSEN 2,498,218
CONVEYING APPARATUS
Filed Aug. 29, 1947
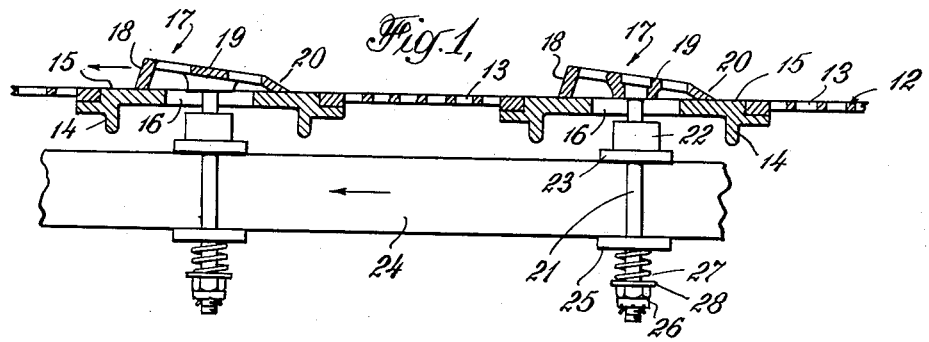
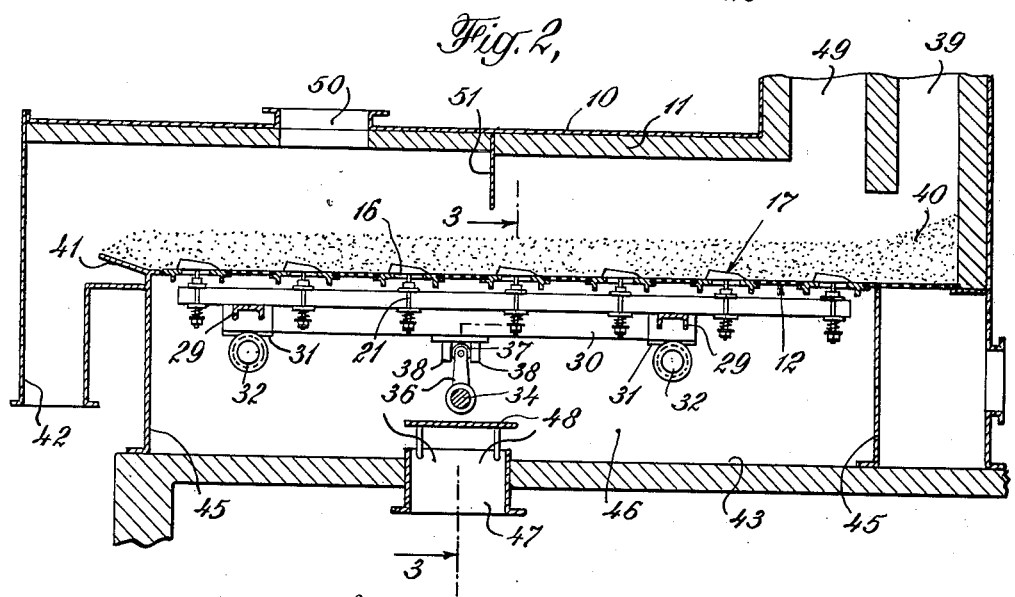
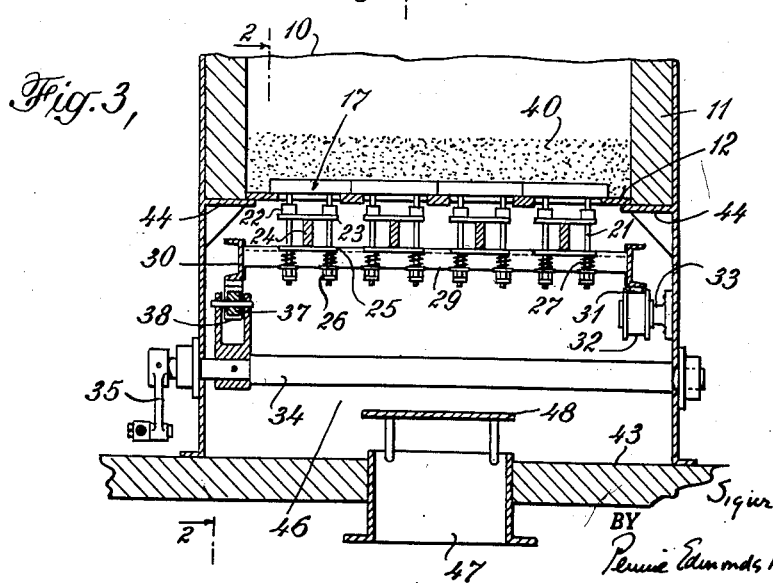
INVENTOR.
Sigurd Nielsen
BY
Pennie Edmonds Morton & Barrows
ATTORNEYS Patented Feb. 21, 1950

2,498,218

UNITED STATES PATENT OFFICE 2,498,218

CONVEYING APPARATUS

Sigurd Nielsen, Copenhagen, Denmark, assignor to F. L. Smidth & Co., New York, N. Y., a corporation of New Jersey Application August 29, 1947, Serial No. 771,272 In Denmark September 30, 1946

14 Claims. (Cl. 34—164)

This invention relates to apparatus for conveying material in bulk and of the type which includes a stationary support and conveying elements reciprocating lengthwise of the support and effective, when moving in one direction only, to advance the material. More particularly, the invention is concerned with a novel conveying apparatus of the type described, which conveys the material at a uniform rate and without surges caused by slides and is so constructed that jamming of the material between the conveying elements and the support, with resultant excessive wear on the parts and damage to the driving means, is prevented.

The new apparatus may be employed for many different conveying purposes, as, for example, it may be used for extracting material from a silo and feeding it to a machine or to another conveyor. In addition, the new apparatus may be employed to advantage for conveying material and simultaneously treating it with gases, examples of such treatment including the cooling of cement clinker, the preheating of cement raw materials, the burning of cement raw materials, with or without admixture of fuel, and the artificial aging of cement. If desired, the material being conveyed may be used as a filtering agent for removing dust from gases passed through the material. As all the advantages of the invention are utilized in an apparatus, in which the material is conveyed and simultaneously treated with gas, a form of the apparatus for such use will be illustrated and described in detail for purposes of explanation.

Conveying apparatus, including an inclined stationary support over which conveying elements are reciprocated, is well known and, in such apparatus, the inclination of the support is such that the material will move only when the friction between the material and support is overcome by the action of the conveying elements in their forward movement. In such apparatus, the material is liable to uncontrollable sliding, especially if gases are passed through the material, since the gases may cause the material to assume a state of partial fluidity. Such sliding is objectionable, in that the material is not advanced at a uniform rate or uniformly treated with the gases, and it increases the gas consumption and is likely to cause overloading of the conveyor or machine to which the material is being fed. The prior apparatus is also subject to the objection that the material is liable to jam between the conveyor elements and the support and this not only causes excessive wear on the parts, but, as a result of the forcing the conveying elements away from the support, may result in damage to the means for moving the elements.

The present invention is, accordingly, directed to the provision of conveying apparatus, including a stationary support and conveying elements reciprocating on the support, which is superior to prior similar apparatus in a number of respects. In the new conveying apparatus, the support may be horizontal, so that accidental sliding of the material is avoided, and the apparatus conveys the material at a uniform rate, even though the material is being treated with gases during the conveying operation.

In the apparatus of the invention, the conveying elements rest on bearing surfaces on the support and the elements press tightly against the surfaces. The pressure applied to the elements is produced by the weight of the material and may be increased by spring means. When springs are employed, the pressure between the contacting surfaces may be varied, as may be desirable or necessary in the conveyance of material of different characteristics.

The conveying elements are wedge-shaped in either vertical or horizontal section and, in one form, for example, each element has a relatively steep front face and its upper surface slopes backwardly toward the rear edge of the element at an angle to the horizontal lower than that of the front face. Because of their wedge-shaped construction, the elements may be moved rearwardly with less resistance than during their forward movement and, as they are moved rearwardly, the material is forced upwardly or laterally and not moved backwardly with the elements. During their forward movement, the elements advance the material with them.

The bearing surfaces on the support, on which the elements are mounted, are each provided with an opening, and the means for reciprocating the elements are disposed beneath the support and connected to the elements through the openings in the bearing surfaces. With this arrangement, the reciprocating means are wholly out of contact with the material being conveyed and out of the path of gases that may have been heated by passage through the material.

For a better understanding of the invention, reference may be made to the accompanying drawing, in which Fig. 1 is a longitudinal vertical section through a portion of the new conveying apparatus;

Fig. 2 is a longitudinal vertical sectional view through a form of the apparatus for simultaneously conveying material and treating it with gases; and Fig. 3 is a sectional view on the line 3—3 of Fig. 2.

The apparatus shown in Fig. 2 comprises a chamber 10, which may be of any suitable construction and, when the apparatus is employed for the simultaneous conveying and cooling of hot material, such as cement clinker, the chamber may be made of metal and provided with a suitable lining 11. The chamber encloses a horizontal stationary support generally designated 12 and the support is provided with perforations 13, so that it is pervious to gases. The support is provided with a plurality of bearing plates 14, the upper surfaces 15 of which are smoothly machined, and each bearing plate has an opening 16 extending therethrough. A conveying element 17 rests on the bearing surface 15 of each plate above the opening.

The conveying elements are wedge-shaped in either vertical or horizontal section and those illustrated are wedge-shaped in vertical section. Each element has a steep front face 18 and a perforated top surface 19, which slopes backwardly from the top of the front face at a lower angle to the horizontal than that of the front face. At its rear end, the top of each conveying element has a portion 20 at a somewhat lower angle to the horizontal than the remainder of the top surface. The lower surface of each conveying element is smoothly machined so as to make tight contact with the bearing surface 15 of its plate 14.

The conveying elements and their bearing plates may be arranged in various ways and, in the construction illustrated, the bearing plates and elements are arranged in rows transverse to the support. The elements in each row preferably make contact end to end, as shown in Fig. 3.

A pair of bolts 21 extend through each element 17 and the opening 16 in its bearing plate, and the bolts pass through individual guides 22 on a transverse bar 23 resting on top of a longitudinal beam 24. The bolts pass through bar 23 and through another bar 25 engaging the bottom of beam 24. Each bolt has a nut 26 threaded on its lower end, and a spring 27 encircles the bolt and bears at its lower end against a washer 28 in contact with the nut, and, at its upper end, against the under surface of bar 25. With this arrangement, each conveying element is held tightly by the springs against the bearing surface 15 of a plate 14.

The longitudinal beams 24 rest upon transverse beams 29, which are secured to longitudinal beams 30. A rail 31 is attached to the lower flange of each beam 30, and the rails run on rollers 32 mounted on pivots 33 secured to the side walls of chamber 10. A shaft 34 is mounted in bearings in the side walls of the chamber below rollers 32 and one end of the shaft exposed beyond the wall of the chamber carries a crank 35, by which the shaft may be rocked. The shaft carries a forked arm 36 within the chamber and a roller 37 is mounted for rotation between the legs of the fork. The roller lies between a pair of guides 38 secured to the under surface of one of the rails 30, so that, as shaft 34 is rocked, the structure, consisting of beams 24, 29, and 30, is reciprocated and causes reciprocation of the conveying elements on their bearing surfaces.

The chamber is provided with an inlet 39 at one end, through which the material 40 to be conveyed may be deposited upon the surface of the support. At the end of the support remote from the inlet, the support is provided with an upwardly sloping discharge plate 41, beyond which there is an outlet 42 for the discharge of material from the chamber.

The support is mounted above the floor 43 of the chamber in any convenient manner and, in the construction illustrated, the edges of the support rest upon plates 44 secured to the side walls of the chamber. Near the ends of the support, partitions 45 rise from the bottom of the chamber and extend to the under surface of the support so that these partitions and the side walls of the chamber form a sub-chamber 46 beneath the support. An inlet 47 for gas to be passed through the material being conveyed leads through the bottom of the chamber into sub-chamber 46, and, preferably, a baffle 48 is mounted above the inner end of the inlet to distribute the gas admitted therethrough. After passing through the support and material thereon, the gas may leave through an outlet 49 from the chamber adjacent the material inlet 39. If desired, the chamber may be provided with another gas outlet 50 near the other end of the support, and a partition 51 may be mounted to extend downwardly from the top wall of the chamber to terminate not far above the layer of material being conveyed. With this arrangement, the apparatus may be used for conveying and cooling cement clinker issuing from a kiln, and the air passing through the material of highest temperature may be led off through outlet 49 and to the kiln for use as secondary combustion air. The cooler air passing through the material, after the temperature thereof has been substantially lowered, may be led off through outlet 50.

In the operation of the apparatus, the movement of the conveying elements to the left in Fig. 2 causes the steep front faces 18 of the elements to engage and advance the material over the support, while on the return movement of the elements, they pass beneath and raise the material without causing any substantial rearward movement thereof. The size of each bearing surface 15, upon which an element rests, is such that the element lies wholly within the outline of the surface at all times and the elements are maintained in tight contact with their bearing surfaces partly because of the weight of the material on the elements and partly by the action of springs 27. Gas used for treating the material passes not only through the perforations in the support but also through the openings 16 in the bearing surfaces to escape through the perforations in the elements. The elements are thus maintained cool, even though the material being conveyed is of high temperature.

I claim:

1. In apparatus for conveying material in bulk, the combination of a substantially horizontal stationary support having a plurality of bearing surfaces spaced along and extending transversely of the support, each bearing surface, having an opening therethrough, a conveying element resting on each bearing surface in direct contact therewith, the element having a steep front face extending transversely of the support and a top surface sloping rearwardly from the front face at a smaller angle to the horizontal than that of the front face, a structure beneath the support mounted for reciprocation lengthwise of the support only, means for reciprocating the structure, and means extending through the openings in the bearing surfaces for connecting the individual elements to the structure for reciprocating movement on the bearing surfaces on which the respective elements are mounted.

2. In apparatus for conveying material in bulk, the combination of a substantially horizontal stationary support having a plurality of bearing surfaces spaced along and extending transversely of the support substantially in the plane of the upper surface thereof, each bearing surface having an opening therethrough, a conveying element resting on each bearing surface in direct contact therewith, the element having a steep front face extending transversely of the support and a top surface sloping rearwardly from the front face at a smaller angle to the horizontal than that of the front face, a structure beneath the support mounted for reciprocation lengthwise of the support only, means for reciprocating the structure, and means for connecting the individual conveying elements to the structure for reciprocation therewith and for holding the elements in contact with their respective bearing surfaces, said means extending through the openings in the bearing surfaces on which the respective elements are mounted, the bearing surfaces being of such size that the elements lie entirely within the outlines of their bearing surfaces during reciprocation of the elements.

3. In apparatus for conveying material in bulk, the combination of a substantially horizontal stationary gas-permeable support having a plurality of bearing surfaces spaced along and extending transversely of the support, each bearing surface having an opening therethrough, a conveying element resting on each bearing surface in direct contact therewith, the element having a steep front face extending transversely to the support and a top surface sloping rearwardly from the front face at a smaller angle to the horizontal than that of the front face and having an opening therethrough, a structure beneath the support mounted for reciprocation lengthwise of the support only, means for reciprocating the structure, and means for connecting the individual conveying elements to the structure and causing the elements to press against their bearing surfaces, said connecting means extending through the openings in the bearing surfaces for the respective elements.

4. In apparatus for conveying material in bulk, the combination of a substantially horizontal stationary support having a plurality of bearing surfaces spaced along and extending transversely of the support, each bearing surface having an opening therethrough, a conveying element resting on each bearing surface in direct contact therewith, the element having a steep front face extending transversely to the support and a top surface sloping rearwardly from the front face at a smaller angle to the horizontal than that of the front face, a structure beneath the support mounted for reciprocation lengthwise of the support only, means for reciprocating the structure, and means for connecting the individual conveying elements to the structure to reciprocate therewith on their respective bearing surfaces, the connecting means extending through the openings in the bearing surfaces for the respective elements and including springs acting to urge the elements against their bearing surfaces.

5. In apparatus for conveying material in bulk, the combination of a substantially horizontal stationary support having a plurality of bearing surfaces arranged in rows extending across and spaced along the support, each surface having an opening therethrough, a conveying element resting on each bearing surface, the element having a steep front face extending transversely to the support and a top surface sloping rearwardly from the front face at a smaller angle to the horizontal than that of the front face, a structure beneath the support mounted for reciprocation lengthwise of the support only, means for reciprocating the structure, and means for connecting the individual conveying elements to the structure to reciprocate therewith, said connecting means extending through the openings in the bearing surfaces on which the respective elements are mounted and said elements lying within the outlines of their bearing surfaces during the movement of the elements.

6. In apparatus for conveying material in bulk, the combination of a substantially horizontal stationary support having a plurality of bearing surfaces arranged in rows extending across and spaced along the support, each surface having an opening therethrough, a conveying element resting on each bearing surface in direct contact therewith, the element having a steep front face extending transversely to the support and a top surface sloping rearwardly from the front face at a smaller angle to the horizontal than that of the front face, adjacent elements in each row having their ends substantially in contact, a structure beneath the support mounted for reciprocation lengthwise of the support only, means for reciprocating the structure, and means for connecting the individual conveying elements to the structure to reciprocate therewith on their bearing surfaces, said means extending through the opening in the bearing surfaces on which the respective elements are mounted.

7. In apparatus for conveying material in bulk, the combination of a substantially horizontal stationary gas-permeable support having a plurality of bearing surfaces, each having an opening therethrough, a conveying element resting on each bearing surface in direct contact therewith, the element having a steep front face extending transversely to the support and a top surface sloping rearwardly from the front face at a smaller angle to the horizontal than that of the front face, a structure beneath the support, means for supporting the structure for reciprocating movement lengthwise of the support only, means for reciprocating the structure, and means connecting the individual elements to the structure for reciprocation therewith and holding the elements in contact with their bearing surfaces during such reciprocation, said means extending through the openings in the bearing surfaces to the respective elements.

8. Apparatus for conveying material and simultaneously treating it with gases, which comprises a chamber containing a substantially horizontal stationary support having a plurality of bearing surfaces spaced along and extending transversely of the support, the support being pervious to gas and each bearing surface having an opening therethrough, a conveying element resting on each bearing surface in direct contact therewith, the element having a steep front face and a top surface sloping rearwardly therefrom at a smaller angle to the horizontal than that of the front face and having an opening therethrough, a structure beneath the support mounted for reciprocation lengthwise of the support only, means for reciprocating the structure, means for connecting the individual elements to the structure to reciprocate therewith and holding the elements against their bearing surfaces during such reciprocation, said means extending through the openings in the bearing surfaces, an inlet to the chamber for delivery of the material to the support at one end thereof, an outlet from the chamber for the material at the other end of the support, partition means forming a sub-chamber defined at its upper end by part of the support at said other end thereof and enclosing said structure, means for admitting gas to the sub-chamber, means for admitting gas to the chamber beneath the support at the end adjacent the inlet for material, and gas outlets from the chamber above the support at opposite ends of the sub-chamber.

9. Apparatus for conveying material and simultaneously treating it with gases, which comprises a chamber containing a substantially horizontal stationary support having a plurality of bearing surfaces spaced along and extending transversely of the support, the support being pervious to gas and each bearing surface having an opening therethrough, a conveying element resting on each bearing surface in direct contact therewith, the element having a steep front face and a perforated top surface sloping rearwardly therefrom at a smaller angle to the horizontal than that of the front face, a structure beneath the support mounted for reciprocation lengthwise of the support only, means for reciprocating the structure, means extending through the openings in the bearing surfaces for connecting the conveying elements to the structure to reciprocate therewith, the connecting means including means for urging the elements against their respective bearing surfaces, an inlet to the chamber for delivery of material to the support at one end thereof, an outlet from the chamber for the material at the other end of the support, partition means forming a sub-chamber defined at its upper end by part of the support at said other end thereof and enclosing said structure an inlet for admitting gas to the sub-chamber means for admitting gas to the chamber beneath the support at the end adjacent the inlet for material, a gas outlet from the chamber above the support adjacent the material inlet, and a gas outlet from the chamber above the support near the material outlet from the chamber.

10. Apparatus for conveying material and simultaneously treating it with gases, which comprises a chamber containing a substantially horizontal stationary support having a plurality of bearing surfaces spaced along the support, the support being pervious to gas and each bearing surface having an opening therethrough, a conveying element resting on each bearing surface in direct contact therewith, the element having a steep front face and a top surface sloping rearwardly therefrom at a smaller angle to the horizontal than that of the front face, a structure beneath the support mounted for reciprocation lengthwise of the support only, means for reciprocating the structure, means extending through the openings in the bearing surfaces for connecting the conveying elements to the structure to reciprocate therewith and holding the elements against their bearing surfaces during their reciprocation, an inlet to the chamber for delivery of material to the support at one end thereof, an outlet from the chamber for the material at the other end of the support, partition means beneath the support forming a sub-chamber defined at its upper end by the major part of the support extending from the discharge end thereof and terminating short of the other end of the support, the sub-chamber enclosing the structure, an inlet for admitting gas into the chamber beneath the portion of the support lying beyond the sub-chamber, an outlet for gas from the chamber above the support adjacent the material inlet, and a second outlet for gas from the chamber near the discharge end of the support.

11. Apparatus for conveying material and simultaneously treating it with gases, which comprises a chamber containing a substantially horizontal stationary support having a plurality of bearing surfaces spaced along the support, the support being pervious to gas and each bearing surface having an opening therethrough, a conveying element resting on each bearing surface in direct contact therewith, the element having a steep front face and a top surface sloping rearwardly therefrom at a smaller angle to the horizontal than that of the front face, a structure beneath the support mounted for reciprocation lengthwise of the support only, means for reciprocating the structure, means extending through the openings in the bearing surfaces for connecting the conveying elements to the structure to reciprocate therewith, said connecting means including means urging the elements against their bearing surfaces, an inlet to the chamber for delivery of material to the support at one end thereof, an outlet from the chamber for the material at the other end of the support, partition means forming a chamber defined at its upper end by a portion of the support adjacent the material outlet, the support projecting beyond the sub-chamber beneath the material inlet and the sub-chamber enclosing the structure, an inlet for admitting gas into the sub-chamber, an inlet for admitting gas into the chamber beneath the portion of the support lying beneath the material inlet, a pair of outlets for gas from the chamber above the support, one outlet lying adjacent the material inlet and the other lying near the material outlet, and a partition depending from the top of the chamber and extending toward the support between the gas outlets.

12. Apparatus for conveying material and simultaneously treating it with gases, which comprises a chamber containing a substantially horizontal stationary support having a plurality of bearing surfaces spaced along the support, the support being pervious to gas and each bearing surface having an opening therethrough, a conveying element resting on each bearing surface in direct contact therewith, the element having a steep front face and a top surface having an opening therethrough and sloping rearwardly from the front face at a smaller angle to the horizontal than that of the front face, a structure beneath the support mounted for reciprocation lengthwise of the support only, means for reciprocating the structure, means extending through the openings in the bearing surfaces for connecting the conveying elements to the structure to reciprocate therewith and for holding the elements in tight contact with their bearing surfaces, an inlet to the chamber for delivery of material to the support at one end thereof, an outlet from the chamber for the material at the other end of the support, partition means beneath the support forming a sub-chamber defined at its top by a part of the support adjacent the material outlet, the sub-chamber enclosing the structure, and the support extending beyond the sub-chamber beneath the material inlet, an inlet for admitting gas into the sub-chamber, an inlet for admitting gas into the chamber beneath the part of the support lying beneath the material inlet, a gas outlet from the chamber above the support and lying close to the material inlet, and a second gas outlet from the chamber above the support lying spaced along the support toward the discharge end thereof.

13. Apparatus for conveying material and treating it with gases, which comprises a chamber, a flat stationary support mounted in the chamber above the bottom thereof, the support having a plurality of bearing surfaces and being pervious to gas between the surfaces, each surface having an opening through it, a conveying element resting on each bearing surface in direct contact therewith, the element having a steep front face and a perforated top surface sloping rearwardly from the top of the front face at a smaller angle to the horizontal than that of the front face, means below the support connected to the conveying elements through the openings in their bearing surfaces for reciprocating the elements in a direction lengthwise of the support, while maintaining the elements in continuous contact with their bearing surfaces, an inlet through the top of the chamber through which material may be deposited upon the support at one end thereof, an outlet for material from the chamber at the other end of the support, partition means beneath the support forming a sub-chamber defined at its top by a part of the support adjacent the material outlet, the support projecting beyond the sub-chamber at its end beneath the material inlet and the sub-chamber enclosing the structure, means for admitting gas into the sub-chamber, means for admitting gas into the chamber beneath the end of the support projecting beyond the sub-chamber, a pair of outlets for gas above the support, one of the gas outlets lying adjacent the material inlet and the other gas outlet lying spaced therefrom toward the material outlet, and a partition depending from the top of the chamber between the gas outlets.

14. In apparatus for conveying material in bulk, the combination of a substantially horizontal stationary support having a plurality of bearing surfaces spaced along the support and lying substantially in the plane of the upper surface thereof, each bearing surface having an opening therethrough, a conveying element resting on each bearing surface in direct contact therewith, the element being wedge-shaped in section with its smaller end at the rear, a structure beneath the support mounted for reciprocation parallel to the support only, means for reciprocating the structure, and means for connecting the individual conveying elements to the structure for holding the elements against their bearing surfaces, said means extending through openings in the bearing surfaces on which the respective elements are mounted, the elements lying in contact with their bearing surfaces throughout their reciprocating movement.

SIGURD NIELSEN.

REFERENCES CITED

The following references are of record in the file of this patent:

UNITED STATES PATENTS

| Number | Name | Date |
| --- | --- | --- |
| 986,877 | Torrey | Mar. 14, 1911 |
| 1,899,033 | Hayes | Feb. 28, 1933 |
| 2,163,556 | Glaze | June 20, 1939 |
| 2,228,840 | Mittendorf | Jan. 14, 1941 |
| 2,312,034 | Gaffney | Feb. 23, 1943 |
| 2,346,176 | McAleer | Apr. 11, 1944 |
| 2,416,763 | Lynch | Mar. 4, 1947 |

FOREIGN PATENTS

| Number | Country | Date |
| --- | --- | --- |
| 4,759 | Great Britain | Nov. 18, 1880 |
| 368,506 | Great Britain | Mar. 10, 1932 |